United States Patent [19]

Ikeda et al.

[11] Patent Number: 5,448,153
[45] Date of Patent: Sep. 5, 1995

[54] CHARGE CONTROL APPARATUS AND ELECTRONIC APPARATUS PROVIDED WITH SUCH A CONTROL APPARATUS

[75] Inventors: Tetsuhito Ikeda, Kawasaki; Junichi Arakawa, Yokohama; Hideo Horigome, Tokyo; Yuichi Kaneko, Yokohama; Akira Kuribayashi, Kawasaki, all of Japan

[73] Assignee: Canon Kabushiki Kaisha, Tokyo, Japan

[21] Appl. No.: 32,208

[22] Filed: Mar. 26, 1993

[30] Foreign Application Priority Data

Mar. 31, 1992 [JP] Japan .................... 4-077364

[51] Int. Cl.⁶ ............................................ H02J 7/10
[52] U.S. Cl. ....................................................... 320/30
[58] Field of Search ................ 320/39, 2, 30, 48, 28, 320/37; 307/66

[56] References Cited

U.S. PATENT DOCUMENTS

| | | | |
|---|---|---|---|
| 3,576,487 | 4/1971 | Chase | 320/39 |
| 3,599,070 | 8/1971 | Davis et al. | 307/66 X |
| 4,920,307 | 4/1990 | Iketani | 320/28 |
| 5,182,583 | 1/1993 | Horigome et al. | 340/636 X |

FOREIGN PATENT DOCUMENTS

| | | |
|---|---|---|
| 3419078A1 | 6/1984 | Germany . |
| 3923919A1 | 1/1990 | Germany . |
| 2143094A | 1/1985 | United Kingdom . |

*Primary Examiner*—Steven L. Stephan
*Assistant Examiner*—Edward Tso
*Attorney, Agent, or Firm*—Fitzpatrick, Cella, Harper & Scinto

[57] ABSTRACT

A control signal is outputted from a CPU in a predetermined period to a one-shot circuit. An output signal of the one-shot circuit is maintained at a predetermined level, as far as the control signal is supplied to the one-shot circuit in the predetermined period. The output signal of the one-shot circuit is applied to a charging circuit for a battery. The charging circuit performs a charge operation for the battery while a predetermined level of the output signal of the one-shot circuit being kept on.

4 Claims, 8 Drawing Sheets

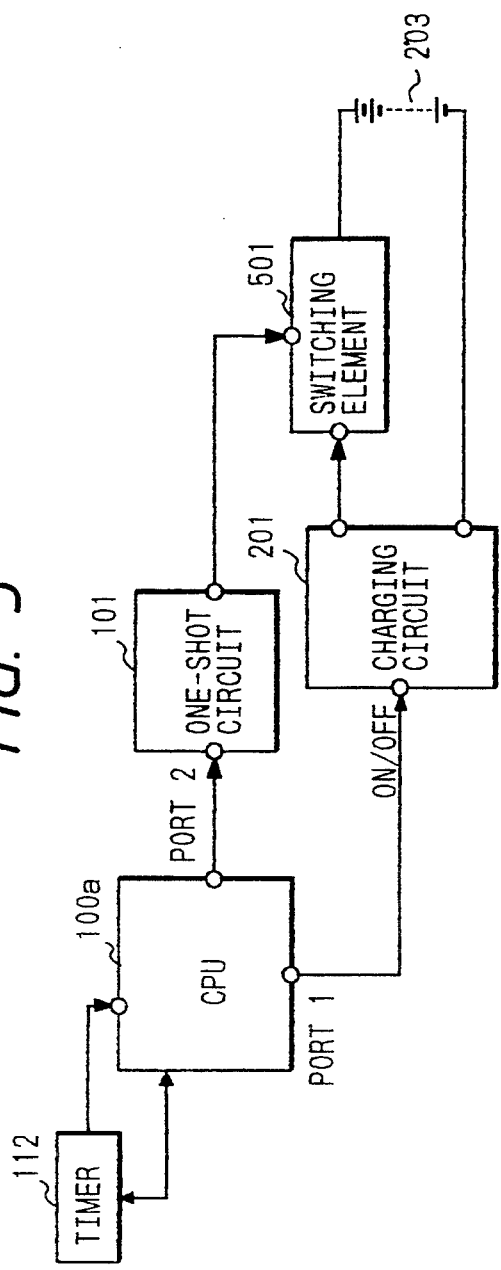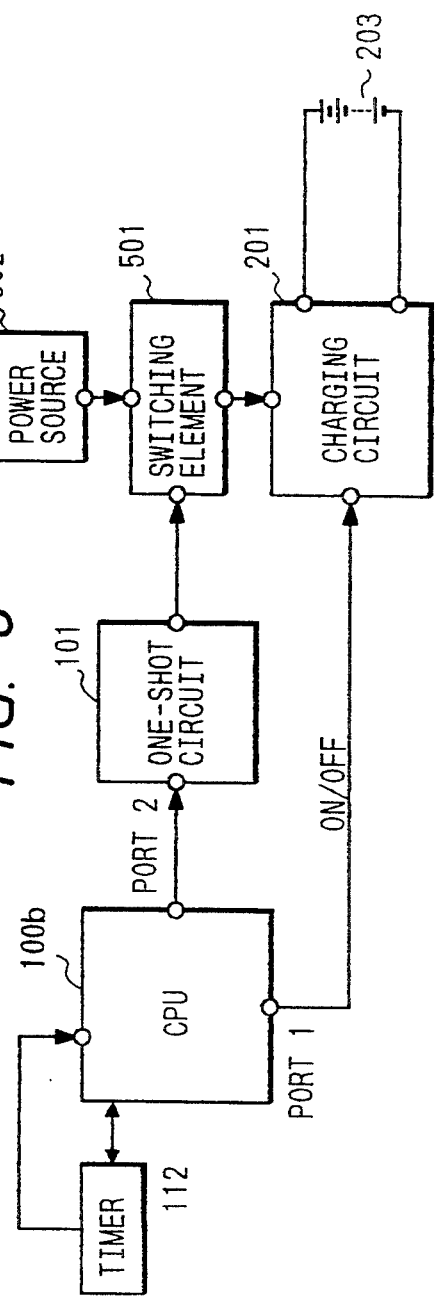

CHARGE CONTROL APPARATUS AND ELECTRONIC APPARATUS PROVIDED WITH SUCH A CONTROL APPARATUS

BACKGROUND OF THE INVENTION

1. Field of the Invention

The present invention relates to an apparatus for controlling chargeable batteries e.g., a secondary battery or the like, and an electronic apparatus provided with such a control apparatus.

2. Related Background Art

Portable electronic apparatuses and the like are generally equipped with a secondary battery, which can be repeatedly utilized by means of charging, so that the apparatuses may be driven by not only a commercial power supply but also the battery. Also, for example, in a printer or the like in which image is recorded on a recording material in accordance with image data transmitted from a host computer, it has been so arranged that the apparatus may be driven by not only a commercial power supply but also the battery as their miniaturization and weight reduction advance. Such a secondary battery is charged by a charging circuit built in the apparatus such as the printer, a charger for use in exclusive or the like. The charging circuit built in the apparatus is provided with a switching circuit for initiating or stopping the charge. The switching circuit is controlled in accordance with a level of a signal from an output port of a central processing unit (CPU).

FIG. 2 is a general arrangement of such a charge control circuit.

Referring to FIG. 2, in case of initiation of charge, when a signal on an output port of a CPU 200 is of high level, for example, a switching circuit 202 is operated so that a charging current flows from a charging circuit 201 to a secondary battery 203 and the secondary battery is charged. While, when the signal on the output port is of low level, the switching circuit 202 stops the charge operation of the charging circuit 201.

In this manner, according to the prior art, the start and stop of charge of the secondary battery is unequivocally determined in accordance with a level of the signal outputted from the output port of the CPU 200. Consequently, if it happens that the CPU 200 runs away for any reason, a level of the signal outputted from the output port is indefinite. Thus, it will be difficult to control the start and stop of charge of the secondary battery 203. In this case, there is no danger when the signal outputted from the output port CPU 200 is of low level. But if it maintains a high level state the secondary battery 203 falls into an over-charging condition, since the secondary battery 203 continues to be charged as long as a current is supplied from the charging circuit 201 thereto. This over-charging invites a problem that the lifetime of the secondary battery 203 is shortened, and also there is a danger that the secondary battery 203 heats excessively.

According to the above-mentioned printer, a process now in execution is interrupted in accordance with an initialization signal outputted from the host computer for initialization of the peripheral equipments so as to perform an initialization processing. Hence, if the initialization signal is entered from the host computer when the printer carries out a charging operation for the secondary battery, the printer interrupts the charging operation in mid course contrary to the operator's intention and performs the initialization processing. This results in a stand-by state in which the printer is receivably waiting for information to be transmitted from the host computer.

SUMMARY OF THE INVENTION

In view of the foregoing, the present invention has been made, and its object is to provide an improved charge control apparatus and an electronic apparatus provided with such a charge control apparatus.

It is another object of the present invention to provide a charge control apparatus having enhanced security which is used for an apparatus employing a chargeable battery, and an electronic apparatus provided with such a control apparatus.

It is still another object of the present invention to provide a charge control apparatus capable of securely preventing an over-charge of a battery even in a case where a control of charging for the battery is impossible, and an electronic apparatus provided with such a control apparatus.

It is still another object of the present invention to provide a charge control apparatus capable of preventing a charging operation for a battery from being erroneously stopped during a charge process for the battery, and an electronic apparatus provided with such a control apparatus.

It is still another object of the present invention to provide an electronic apparatus in which a charge process for a battery is not interrupted even in a case where an initialization signal is entered from an external apparatus connected to the electronic apparatus.

The objects and features of the present invention will become more apparent from the following description taken in conjunction with the accompanying drawings.

BRIEF DESCRIPTION OF THE DRAWINGS

FIG. 5 is a block diagram showing an arrangement of a charging circuit according to a second embodiment of the present invention;

FIG. 6 is a block diagram showing an arrangement of a charging circuit according to a third embodiment of the present invention;

DESCRIPTION OF THE PREFERRED EMBODIMENTS

Preferred embodiments of the present invention will be described in detail with reference to the accompanying drawings.

Figure 1:
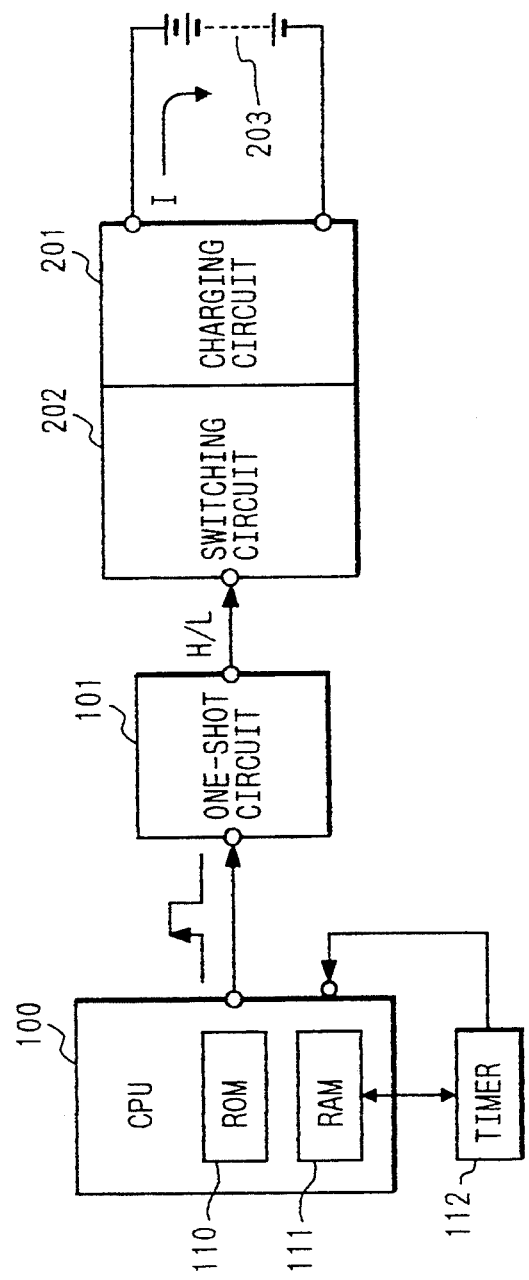
FIG. 1 is a block diagram showing an arrangement of a charge control circuit according to a first embodiment of the present invention.
Figure 2:
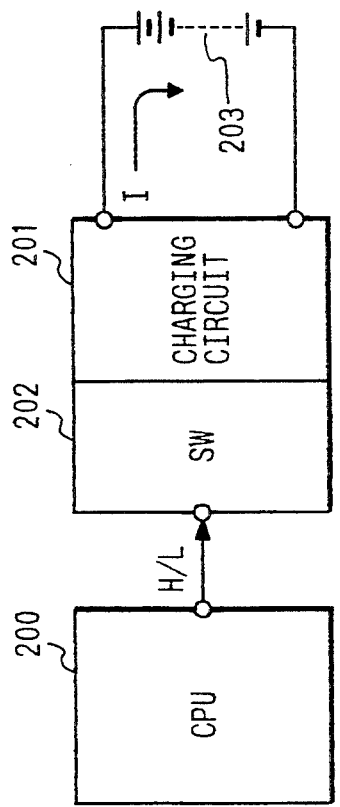
FIG. 2 is a block diagram showing an arrangement of a conventional charge control circuit.
Figure 4:
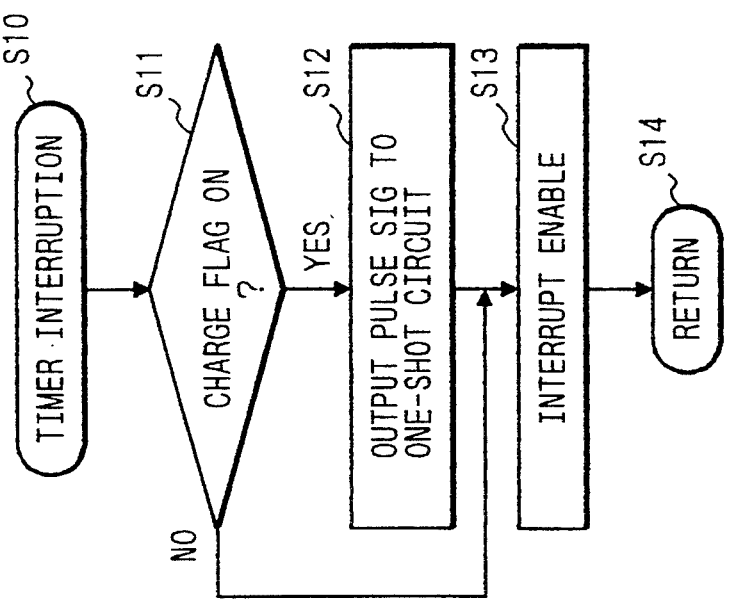
FIG. 4 is a flow chart useful for understanding an interruption process in the CPU according to the first embodiment of the present invention.
Figure 3:
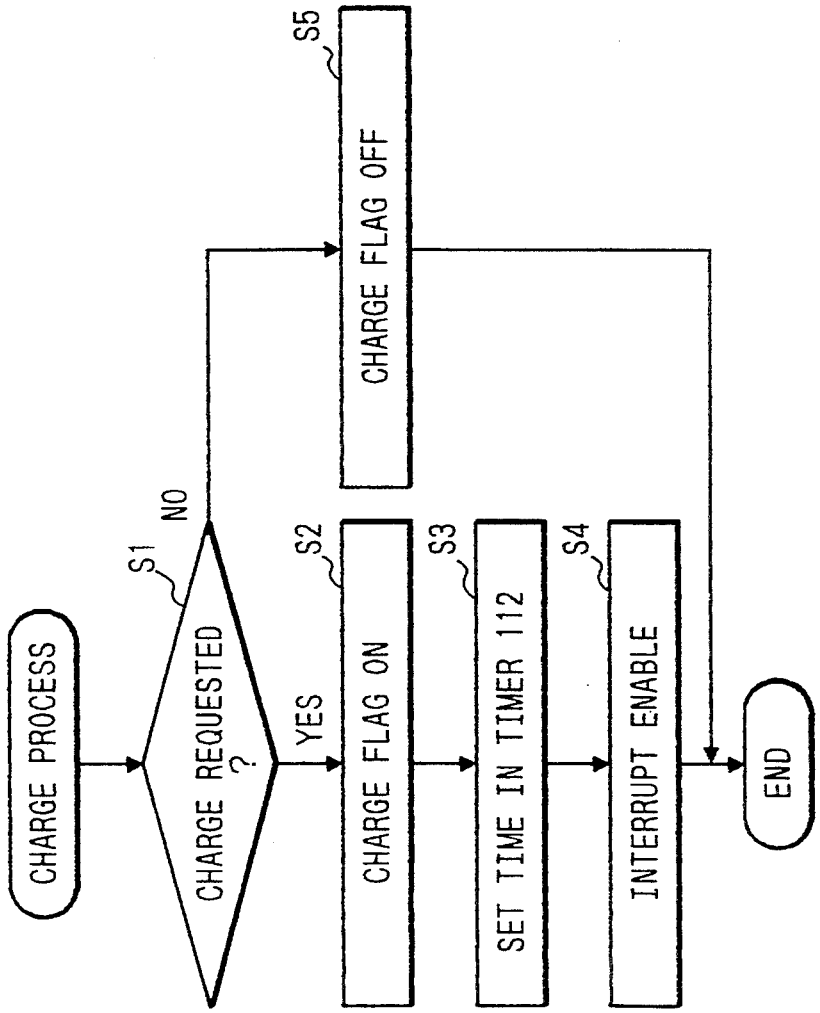
FIG. 3 is a flow chart useful for understanding a charge process of a CPU according to the first embodiment of the present invention.

FIG. 1 is a view showing a connection among a charging circuit, a secondary battery and a CPU according to the present embodiment. In FIG. 1, the same parts are denoted by the same reference numbers as those of FIG. 2. In this embodiment, the secondary battery 203 is to supply power to each unit of such an ink jet printer that uses thermal energy to cause a status variation of an ink so that the ink is ejected to record an image on a recording material, which printer will be described later in detail. In FIG. 1, a reference numeral 100 denotes a CPU (Central Processing Unit) for performing a control of charging and an operation control of each unit of the ink jet printer; 101 a re-triggerable one shot multivibrator (referred to as a one-shot circuit hereinafter) for receiving a pulse signal from the CPU 100 as a trigger signal to output a charge control signal; 202 a switching circuit for switching over between initiation and stop of the charge in accordance with an output level of the charge control signal from the one-shot circuit 101; 201 a charging circuit for charging the secondary battery 203; 110 a ROM (Read Only Memory) for storing a control program of the CPU 100 represented by flow charts as shown in FIGS. 3 and 4 and various sorts of data; 111 a RAM (Random Access Memory) which is available as a working area of the CPU 100 and has therein a charge flag and others described later; and 112 a programmable timer adapted to output an interruption signal to the CPU 100 at a period of time set up by the CPU 100.

An operation of the circuit shown in FIG. 1 will be explained. If a charging operation is not performed, an output of the CPU 100 is held at a high or low level. In this case, an output of the one-shot circuit 101 is usually given with a low level so that the switching circuit 202 is disabled and the secondary battery 203 is not charged.

In a case where the secondary battery 203 is charged, first, the CPU 100 sets in the timer 112 a value corresponding to a time period shorter than a width of a one-shot pulse outputted from the one-shot circuit 101, and issues a pulse signal to the one-shot circuit 101 in synchronism with a timer interruption entered from the timer 112. Upon receipt of this pulse signal, the one-shot circuit 101 is triggered at a leading edge or trailing edge of the pulse signal to change its output from a low level to a high level. As long as the pulse signal is periodically supplied from the CPU 100 to the one-shot circuit 101, the one-shot circuit 101 is re-triggered, so that an output of the one-shot circuit 101 maintains a high level. Hence, the switching circuit 202 actuates the charging circuit 201 while the output of the one-shot circuit 101 is of high level, so that the charging circuit 201 serves to charge the secondary battery 203.

If the CPU 100 runs away, it is probably impossible to allow interruption by the timer 112. Thus, the CPU 100 cannot continue to supply the pulse signal to the one-shot circuit 101 periodically. This makes the re-trigger of the one-shot circuit 101 impossible, and as a result the output of the one-shot circuit 101 changes in level from a high level to a low level after the elapse of a predetermined time period. In this manner, the charging circuit 201 is disabled by the switching circuit 202 to inhibit the secondary battery 203 from being charged.

FIG. 3 is a flow chart useful for understanding a charge process under control of the CPU 100, and FIG. 4 is a flow chart useful for understanding an interruption process according to the timer 112.

First, referring to FIG. 3, in step S1 it is determined whether or not charging of the secondary battery 203 is requested on the basis of (1) an instruction for charging the secondary battery 203, entered from a predetermined key switch or the like, or (2) the determination by the CPU according to the check of a voltage of the secondary battery 203 or the like. When the charge is requested, the procedure advances to a step S2 in which a charge flag of the RAM 111 is set to ON. Then, in a step S3, a time value is set in the timer 112. This set time value is shorter than a time width of the one-shot pulse outputted from the one-shot circuit 101. In a step S4, the enable-condition is interrupted to terminate the charge process. While, if in the step S1 it is determine that no charge is requested, the procedure advances to a step S5 in which the charge flag of the RAM 111 is set to OFF to terminate the charge process.

Next, referring to the flow chart of FIG. 4, the interruption process according to the timer 112 will be explained below.

If an interruption occurs in a step S10, the procedure advances to a step S11 in which it is determined whether the charge flag of the RAM 111 is ON. If the charge flag of the RAM 111 is OFF, the procedure advances to a step S13 in which the enable-condition is interrupted to return to the main process.

While, if the charge flag of the RAM 111 is ON in the step S11, the procedure advances to a step S12 in which the pulse signal is applied to the one-shot circuit 101. Thus, the one-shot circuit 101 is triggered to change the output pulse to a high level. This interruption is repeated within the time width of the output pulse of the one-shot circuit 101. Thereby, the one-shot circuit 101 is re-triggered, so that the output signal is kept to be of a high level.

According to the embodiment as described above, it is so arranged that the CPU 100 outputs the pulse signal to the one-shot circuit 101 on the basis of timer interruption caused by the interruption signal from the timer 112. However, the present invention is not restricted to this arrangement. For example, it may be so arranged that the CPU 100 detects a state of the timer 112 and determines whether or not it is a timing suitable for outputting a pulse signal to the one-shot circuit 101. Further, it may be so arranged that instead of the timer 112, a program is used to determine whether a predetermined time elapses and a pulse signal is outputted to the one-shot circuit 101 accordingly.

FIG. 5 is a block diagram showing an arrangement of a charging circuit according to a second embodiment of the present invention. In FIG. 5, the same parts are denoted by the same reference numbers as those of the above mentioned figures, and the explanation thereof is omitted.

Reference numeral 501 denotes a switching element to be controlled by an output of the one-shot circuit 101. The switching element 501 is prepared in the midst of a line where a charge current from the charging circuit 201 flows.

The charging operation according to the circuit shown in FIG. 5 will be explained hereinbelow. An output signal to instruct a charging start is outputted from an output port 1 of a CPU 100a. This signal is given with a high level or a low level, and in response to the signal the charging circuit 201 starts a charging current flowing to the secondary battery 203. Simultaneously, a pulse signal is supplied in periods from an output port 2 of the CPU 100a to the one-shot circuit 101. While this pulse signal is supplied in periods to the one-shot circuit 101, the output signal of the one-shot circuit 101 maintains a high level, so that the switching element 501 is operative to close the line from the charging circuit 201 to the secondary battery 203. Consequently, the charging current is supplied from the charging circuit 201 to the secondary battery 203, thereby charging the secondary battery 203.

According to the present embodiment, the pulse signal outputted from the output port 2 of the CPU 100a may be always outputted to the charging circuit 201 even when it is out of charging. In this case also, even when the CPU 100a runs away, the pulse signal is not outputted to the one-shot circuit 101 periodically for the same reason as mentioned concerning the first embodiment. Accordingly, the charging of the secondary battery 203 ceases in due course.

The operation of the CPU 100a according to the second embodiment may be achieved in such a manner that between the steps S2 and S3 in the flow chart of FIG. 3, there is provided a step in which an output signal for instructing the charging circuit 201 to initiate the charging operation is delivered from the output port 1 of the CPU 100a.

FIG. 6 is a block diagram showing an arrangement of a charging circuit according to a third embodiment of the present invention. In FIG. 6, the same parts are denoted by the same reference numbers as those of the above mentioned figures, and the explanation thereof is omitted.

Reference numeral 502 denotes a power source for use in the charging circuit 201. The switching element 501 is arranged in the midst of a line for supplying the power from the charging circuit 201 to the power source 502.

The charging operation according to the charge control circuit shown in FIG. 6 is described now. An output signal given with a high level or a low level to instruct a charging start is outputted from an output port 1 of a CPU 100b. Thereby, the secondary battery 203 falls in a charging condition. Simultaneously, a pulse signal is supplied in periods from an output port 2 of the CPU 100b to the one-shot circuit 101. While this pulse signal is supplied in periods to the one-shot circuit 101, the output signal of the one-shot circuit 101 maintains a high level, so that the switching element 501 is actuated to supply electric power from the power source 502 to the charging circuit 201, thereby charging the secondary battery 203.

Accordingly, in this case also, if the CPU 100b runs away owing to any cause and no pulse signal is supplied to the one-shot circuit 101, an output signal of the one-shot circuit 101 changes to a low level, so that no electric power is supplied from the power source 502 to the charging circuit 201. In this manner, the charge of the secondary battery 203 is automatically stopped. In this case, the pulse signal outputted from the output port 2 of the CPU 100b may be always outputted to the charging circuit 201 even when it is not charging.

As described above, according to the present embodiment, the pulse signal generated by periods from the CPU is applied to a re-triggerable multivibrator. In accordance with an output of the re-triggerable multivibrator, the start/stop of charging is controlled. Therefore, even when the CPU runs away by any cause and the CPU malfunctions, the charge of the battery can be stopped. Thus, it is possible to prevent an occurrence of an accident due to an over-charge of the battery.

Next, referring to FIG. 7, a fourth embodiment of the present invention will be explained below.

Figure 7:
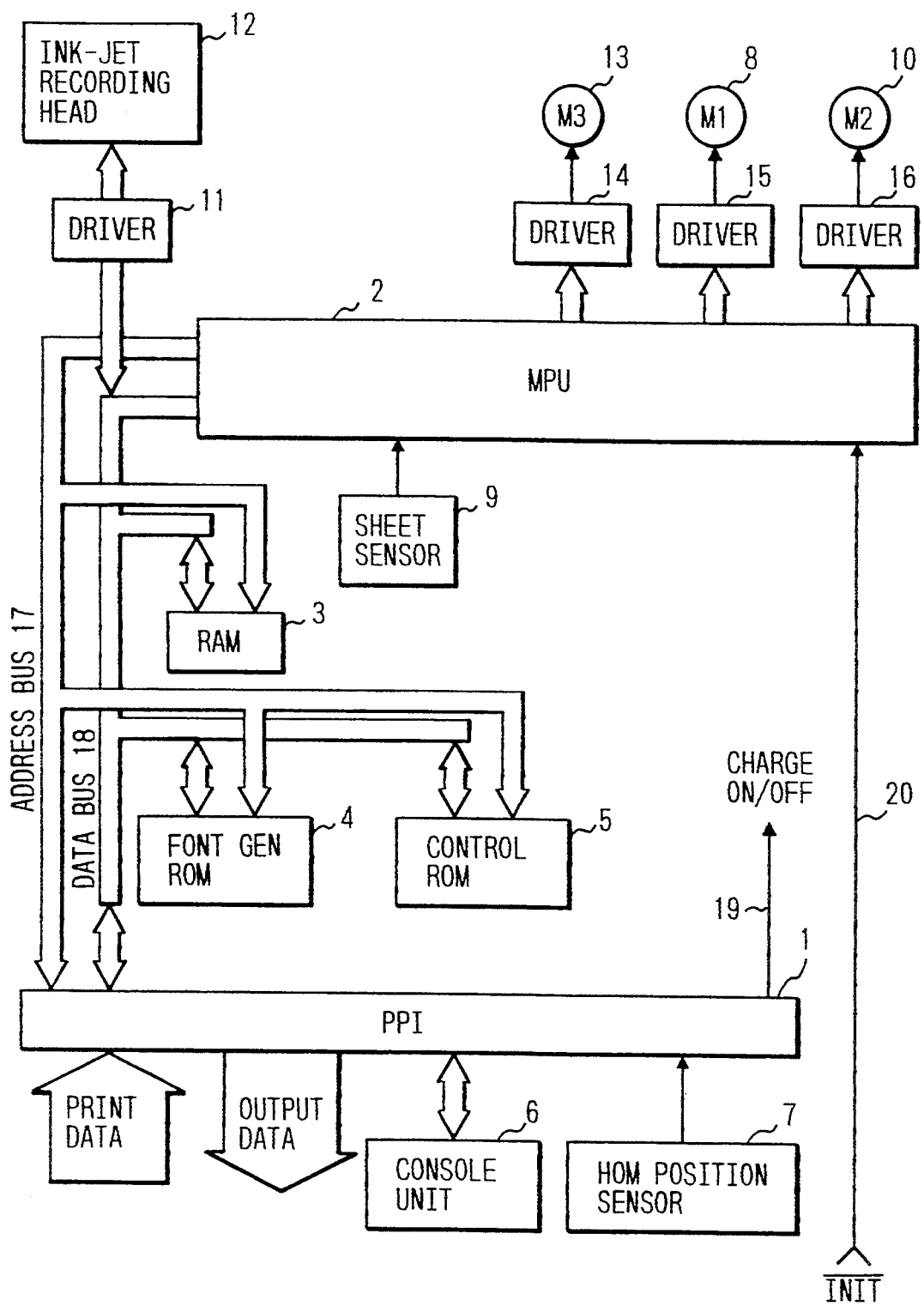
FIG. 7 is a block diagram schematically showing an arrangement of an ink jet printer according to a fourth embodiment of the present invention.

FIG. 7 is a block diagram schematically showing an arrangement of an ink jet printer associated with the fourth embodiment of the present invention.

The ink jet recording apparatus-shown in FIG. 7 comprises: a programmable peripheral interface 1 (referred to as PPI hereinafter) which in parallel receives command signals transmitted from a host computer and a recording information signal, and transfers those signals to an MPU (Micro Processing Unit) 2, and which in addition performs a control of a console unit 6, an input process of a carriage home position sensor 7 and so on; the MPU 2 for controlling operations of the respective components of the ink jet recording apparatus; a RAM 3 for storing the received signals; a font generation ROM 4 for outputting images such as characters and symbol marks; and a control ROM 5 for storing a processing sequence to be executed by the MPU 2. These elements are connected through an address bus 17 and a data bus 18 to the MPU 2, and are controlled by control signals from the MPU 2.

The ink jet recording apparatus further comprises: a carriage motor 8 for moving in a main scanning direction a carriage equipped with a recording head 12; a sheet feed motor 10 for transferring a recording material in a direction (a sub-scanning direction) perpendicular to the moving direction (the main scanning direction) of the carriage; a capping motor 13 for driving a capping member to contact with an ink orifice (not shown) of the recording head 12 so that the ink orifice is shielded from the air; a driver 15 for driving the carriage motor 8; a driver 16 for driving the sheet feed motor 10; and a driver 14 for driving the capping motor 13. The console unit 6 is equipped with a keyboard, an indication lamp and the like.

The carriage home position sensor 7 is provided near a home position of the carriage and serves to detect the fact that the carriage equipped with the recording head 12 arrives at a home position. A sheet sensor 9 detects presence/absence of a recording material such as recording sheets, i.e., as to whether the recording material is supplied to the recording unit. The recording head 12 is an ink jet recording head employing such a scheme that the use of thermal energy induces a status variation of an ink to eject the ink. The recording head 12 is provided with orifices (not shown), ejection heaters (not shown) and the like. A driver 11 drives the ejection heaters of the recording head 12 in accordance with a recording information signal.

In the above-mentioned arrangement, the MPU 2 is connected through the PPI 1 to a host apparatus such as a computer, and it receives commands and the recording information signals (print data). The received information signals or print data are stored in the RAM 3 for record. These processes are carried out in accordance with a control program stored in the control ROM 5.

According to the above-mentioned ink-jet printer or recording apparatus, interruption is caused with an initialization signal outputted from the host computer for initialization of the peripheral equipments, to thereby suspend and the process now in execution perform an initialization process. Hence, if the initialization signal is entered from the host computer when the printer carries out a charging operation for the secondary battery 26, the printer interrupts the charging operation in mid course contrary to the operator's intention and performs the initialization processing. In view of this, it is a subject of the embodiment of the present invention, which will be explained hereinafter, that the printer end can determine whether the initialization signal is receivable, thereby avoiding an interruption of the charging operation.

Next, referring to FIG. 8, the power source 21 of the ink jet recording apparatus according to the present embodiment will be explained. Of course, as a charging circuit used in the present embodiment a charging circuit having the same arrangement as that in the above-mentioned first, second or third embodiments may be used.

Figure 8:
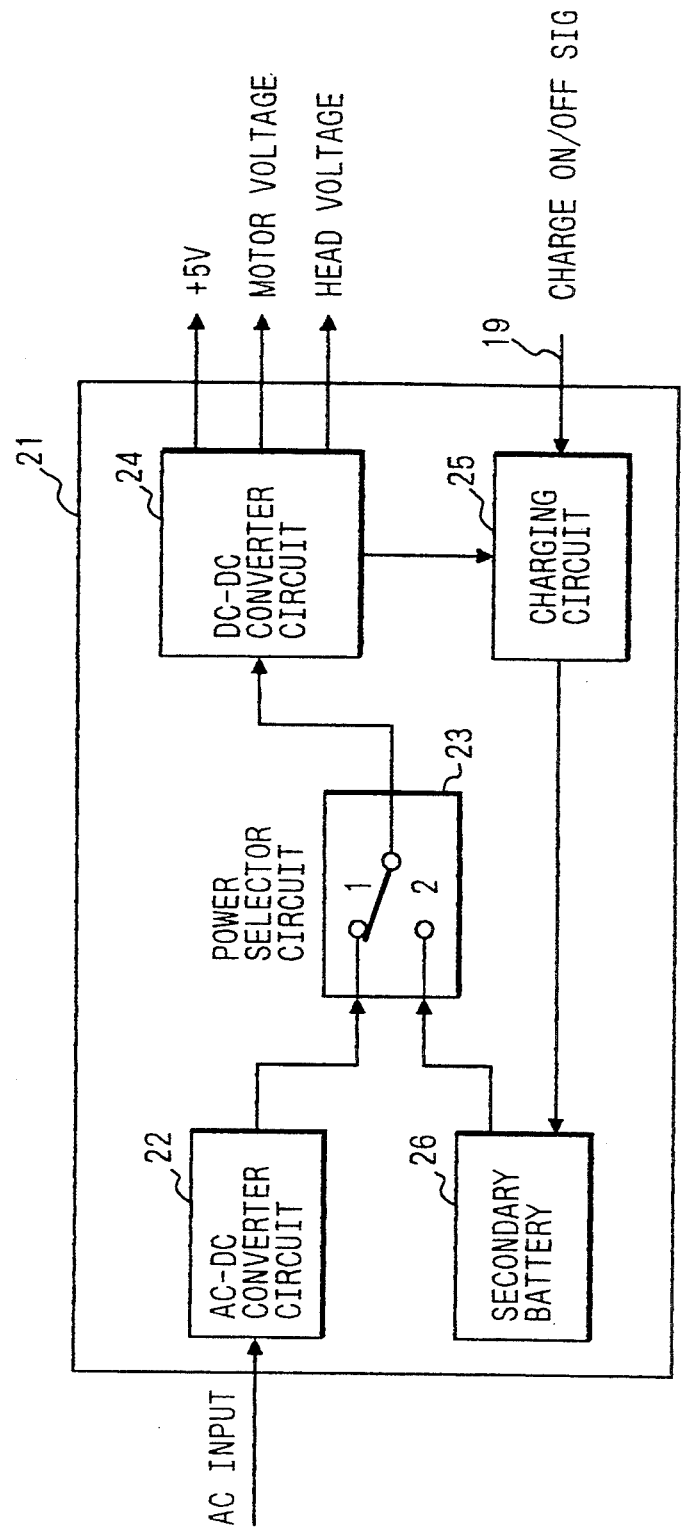
FIG. 8 is a block diagram showing an arrangement of a charge control circuit of the ink jet printer according to the fourth embodiment of the present invention.

In FIG. 8, there are provided two driving power sources of the ink jet recording apparatus, one of which is an AC-DC converter circuit 22 for obtaining a DC output from an AC input, for example an AC adapter, and the other being a chargeable secondary battery 26. A power source switching circuit 23 optionally selects either of the AC-DC converter circuit 22 or the secondary battery 26. As the power source switching circuit 23, for example, an analog switch, a power source jack or the like may be used. During the use of the AC power source and the charging of the secondary battery 26, the switching circuit 23 is connected to a contact 1. When the secondary battery 26 is used to drive the ink jet recording apparatus, the switching circuit 23 is connected to a contact 2. A DC-DC converter circuit 24 converts a DC output of the driving power source into a suitable voltage supplied to each unit of the ink jet recording apparatus. A charging circuit 25 charges the secondary battery 26. On/off of a charging operation of the charging circuit 25 is controlled in accordance with a charge on/off signal 19 generated from the output port of the PPI 1 (charged at high level).

Figure 9:
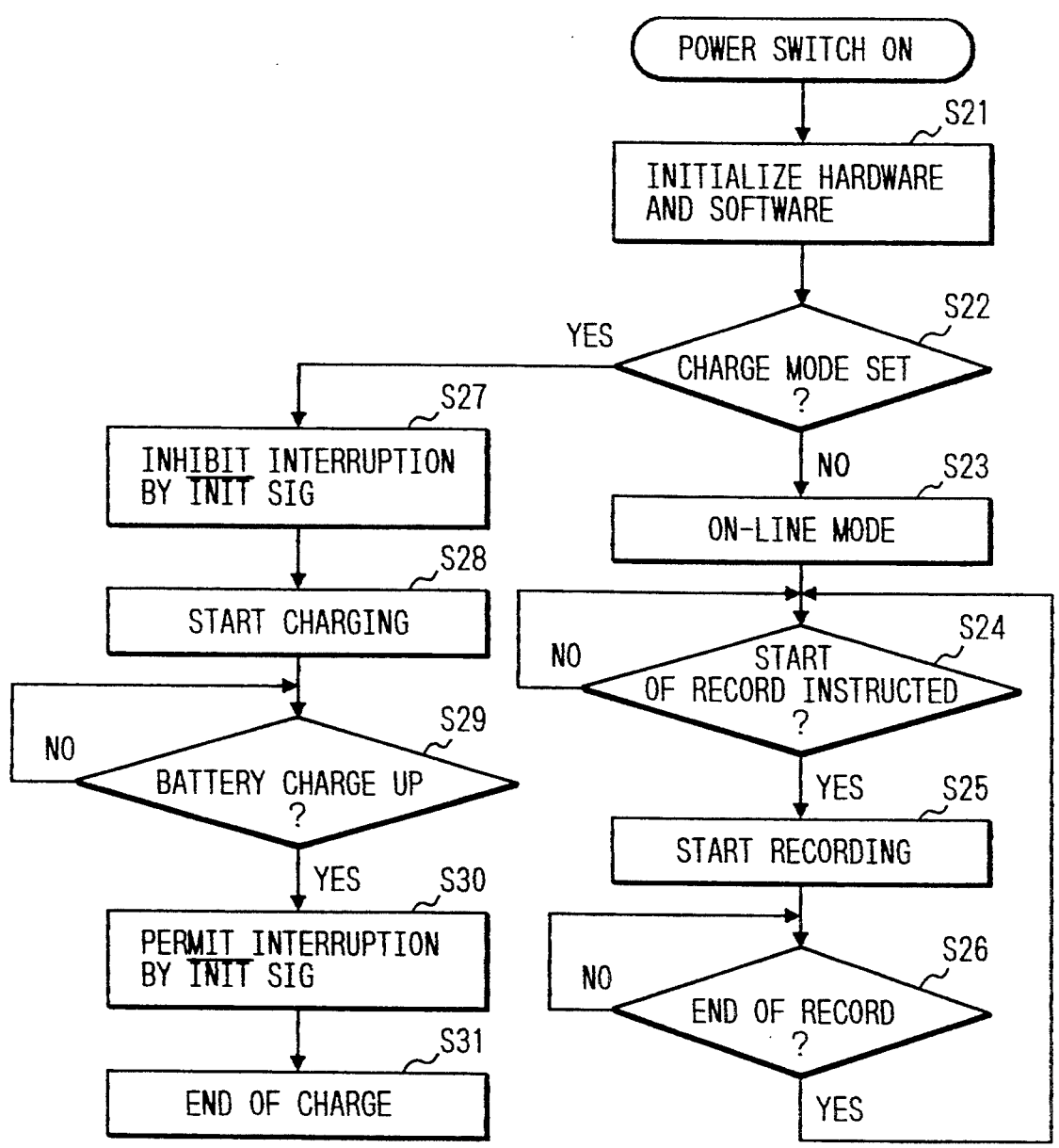
FIG. 9 is a flow chart useful for understanding a process in an MPU according to the fourth embodiment of the present invention.

FIG. 9 is a flow chart useful for understanding a control operation of the ink jet recording apparatus according to the fourth embodiment. A control program for executing this process is stored in the ROM 5. This flow chart starts when the power source is turned on and the control program stored in the control ROM 5 starts.

First, a step S21 performs, as an initialization process at the time of power-on, initial setting of the PPI 1, an operation check of the RAM 3, an initialization of the RAM 3, an operation check of the ROM 5 and so on. Further, the step S21 performs a check of statuses of DIP switches and various kinds of keys on the console unit 6, and initial setting of parameters, flags and so on which are used in the associated processes. As methods of charging the secondary battery 26, there are two ways, one of which is such that the ink jet printer is set in a charge-dedicated mode, and the battery is charged, and the other of which is such that the ink jet printer is operated as a usual printer while the battery 26 is gradually charged by applying thereto a very small current of about one-fiftieth of the battery capacity (trickle charge method). The present embodiment employs the former way.

A step S22 determines as to whether the ink jet recording apparatus is set in a charging mode. The charging mode is set, for example, by means of depression of a predetermined key or the like on the console unit 6 within a predetermined period of time after turn-on of the power source. When the start of charge is not required, the program proceeds to a step S23 to confirm an on-line mode. After the confirmation of the on-line mode, the program proceeds to a step S24 in which recording information transmitted from the host computer is awaited and checked. When it is decided that the recording start is instructed, the program proceeds to a step S25 to carry out a recording operation. And thereafter the procedure advances to a step S26, and returns to the step S24 when the recording is terminated. After the termination of the recording process, if the operation mode is switched from the on-line mode to an off-line mode, it may be so programmed that the procedure returns to the step S22 in which it is determined as to whether the charge instruction is entered.

On the other hand, if the step S22 determines that the charge mode is instructed, the program proceeds to a step S27 in which interruption by an initialization signal (INIT) entered from the host computer is inhibited. In a step S28, the power source switching circuit 23 is connected to the contact 1, and a charge ON signal 19 is outputted from the PPI 1. In response to this signal, the charging circuit 25 is actuated to start to charge the secondary battery 26. Next, the program proceeds to a step S29 in which it is determined whether or not the secondary battery 26 has been fully charged to a normal capacity by means of detection of a battery voltage of the charged secondary battery 26 or a change in a battery temperature, or observation of the time taken for charge of the secondary battery 26. When it is decided that the secondary battery 26 has been fully charged to the normal capacity, the program proceeds to a step S30 which permits occurrence of interruption by an initialization signal entered from the host computer. In a step S31, the charging operation for the secondary battery 26 is terminated.

Hence, even if an initialization signal is entered from the host computer while the secondary battery 26 is charged, the charging process is not interrupted.

Figure 10:
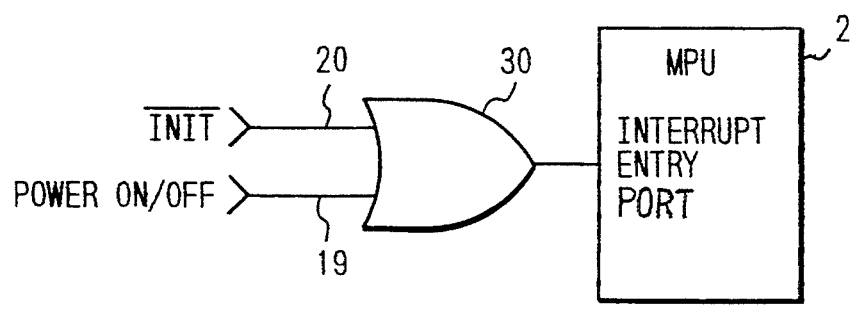
FIG. 10 is a block diagram showing an input circuit of an interruption signal to an MPU according to a fifth embodiment of the present invention.

FIG. 10 is a view showing a circuit arrangement according to the fifth embodiment which is a variation of the above-mentioned fourth embodiment. In this embodiment also, interruption by a initialization signal entered from the host computer is avoidable.

In FIG. 10, reference numeral 20 stands for an initialization signal (INIT) entered from the host computer; and 19 a charge control signal outputted from the output port of the PPI 1. These two signals are applied to an OR circuit 30 of which an output is connected to an interrupt signal input port of the MPU.

In this arrangement, the INIT signal 20 is effective in a low level state. The charge control signal 19 provides a charge mode and a recording mode in its high level state and low level state, respectively. In the charge mode, the output of the OR circuit 30 is of a high level due to the charge control signal 19, so that no interruption occurs in the MPU 2 even if the initialization signal is entered from the host computer.

Consequently, in the charge mode, even if the initialization signal (INIT) 20 is entered from the host computer, a charge process for the secondary battery 26 is not interrupted by the initialization interruption, since the INIT signal 20 is disregarded in the ink jet recording apparatus.

In the recording mode, since the charge control signal 19 is in a low level state, the OR circuit 30 provides an output signal of a low level when the INIT signal 20 is transmitted in its low level state from the host computer. Thus there occurs an interruption by the INIT signal 20. This in turn leads to the initialization of a control system of the ink jet printer.

Figure 11:
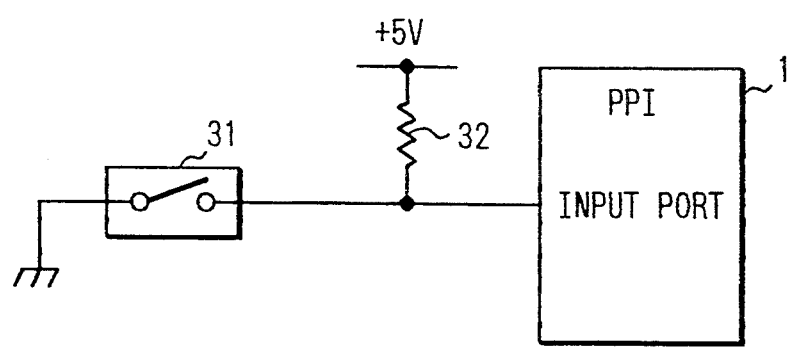
FIG. 11 is a block diagram showing a circuit arrangement for an interruption process according to a sixth embodiment of the present invention.

FIG. 11 is a view showing a circuit arrangement (the sixth embodiment) for conducting an interrupt process by an initialization signal (INIT) by means of a selector such as the DIP switch of the console unit 6.

In FIG. 11, reference numeral 31 denotes a selector switch adapted to optionally select inhibition or allowance of interruption. One of contacts of the selector switch 31 is grounded, the other being pulled-up through a resistance 32 to +5V power source, and in addition connected to an input port of the PPI 1.

Referring to FIG. 11, when the selector switch 31 turns off, +5V i.e., a high level signal is applied to the input port of the PPI 1. On the other hand, when the selector switch 31 turns on, 0V i.e., a low level signal is applied to the input port of the PPI 1. For example, it may be so arranged that when the selector switch 31 turns off, an interruption process by the INIT signal is inhibited, while when the selector switch 31 turns on, the interruption process by the INIT signal is not inhibited.

Figure 12:
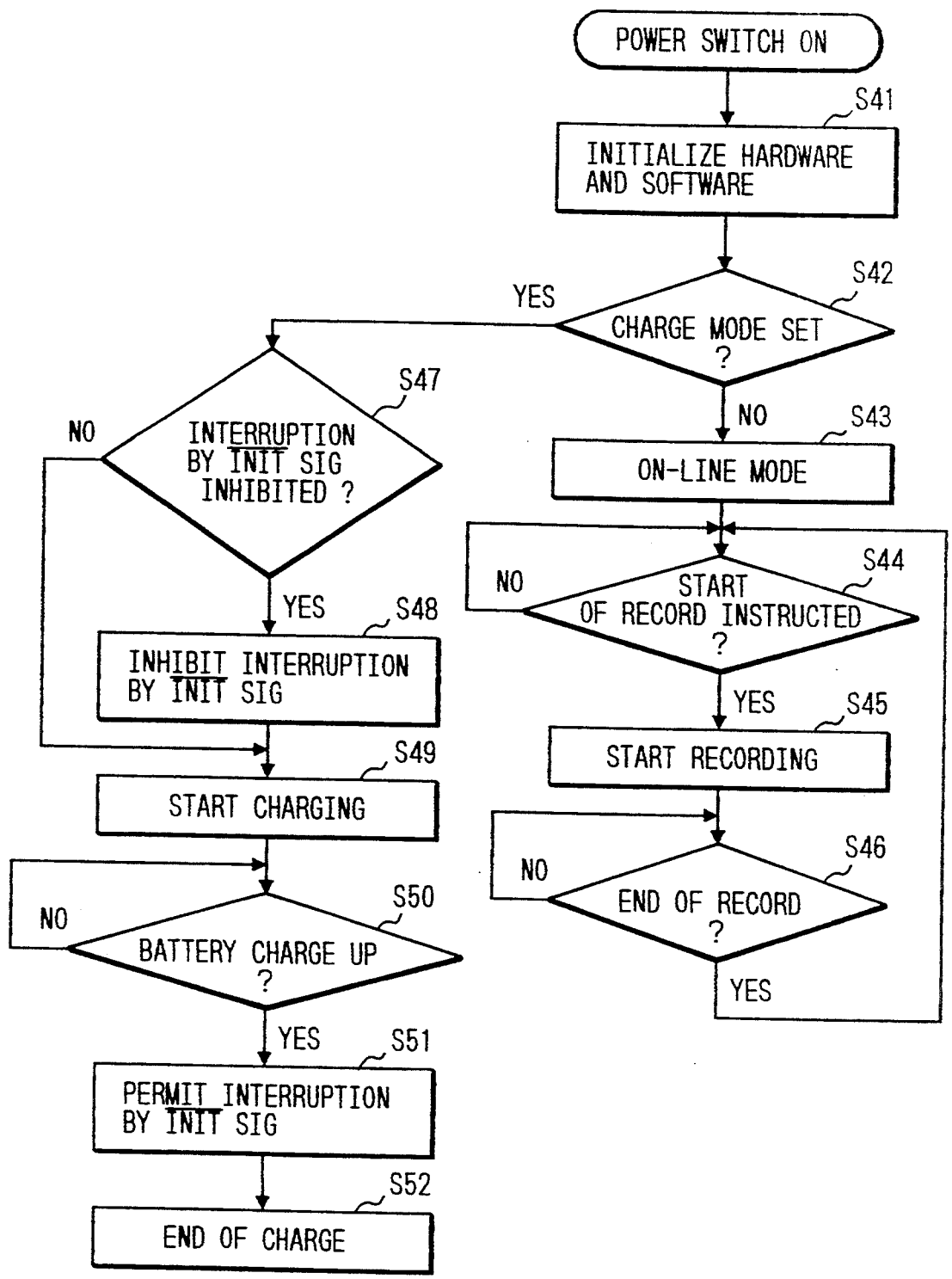
FIG. 12 is a flow chart useful for understanding a process in an MPU according to the sixth embodiment of the present invention.

FIG. 12 is a flow chart useful for understanding a control of the MPU 2 according to the sixth embodiment of the present invention. A control program for executing this process is stored in the control ROM 5.

In the flow chart of FIG. 12, the steps S41 to S46 are equal to the steps S21 to S26 shown in FIG. 9, and thus the explanation thereof will be omitted.

If a step S42 identifies a charge mode, the program proceeds to a step S47 in which a state of the switch 31 is detected and it is determined as to whether an interruption by the initialization signal from the host computer is permitted. That is, if the signal applied to the input port of the PPI 1 is of a high levels it is determined that the interruption is inhibited, and if it is of a low level, it is identified that the interruption is not inhibited. If the signal applied to the input port is of a high level, the program proceeds to a step S48 to inhibit an interruption by the initialization signal and then advances to a step S49. In the step S49 and a step S50, the same as in the steps S28 and S29 in FIG. 9, the secondary battery 26 is charged. Upon completion of the charge of the battery, the program proceeds to a step S51 to permit occurrence of an interruption by the initialization signal from the host computer, and then advances to a step S52 to terminate the charge process.

As described above, according to the present embodiment, it is possible to prevent an erroneous stop of the charging operation, without rising of the cost of the apparatus, thereby enhancing an operability of the apparatus.

While a present embodiment according to the present invention has been described as an ink jet printer, the present invention is not restricted to this embodiment, but it is applicable to all such electronic apparatuses as a communication apparatus or various sorts of terminals which are initialized by an initialization signal entered from an external apparatus such as a host computer.

Further the present invention is also applicable to either a system comprising a plurality of apparatuses or an equipment comprising a single apparatus. Furthermore, the present invention is applicable to a case where an object of the invention may be achieved by supplying to the system or the equipment a program for carrying out the present invention.

What is claimed is:

1. A charge control apparatus in an electronic equipment which receives power from a chargeable battery and conducts a predetermined process and which includes control means for controlling process means for conducting the predetermined process having means for generating a signal of a predetermined period, said charge control apparatus comprising:

signal output means for, upon reception of the signal of a predetermined period, outputting a charge instruction signal for instructing charging, and for, in a case of not receiving the signal of predetermined period, outputting no charge instruction signal; and charging means for charging the battery in response to the charge instruction signal from said signal output means, wherein said signal of predetermined period is generated in normal operation of the control means and is not generated in abnormal operation of the control means.

2. An apparatus according to claim 1, wherein said signal output means outputs the charge instruction signal during reception of the signal of predetermined period, and does not output the charge instruction signal after the signal of predetermined period is not received.

3. An apparatus according to claim 1 or claim 2, wherein said charging means is provided with a switching means for switching, in accordance with the charge instruction signal outputted from said signal output means, between a state of the supply of a charge current to the battery and a state of cut-off of the charge current to the battery.

4. An apparatus according to claim 1 or claim 2, wherein said charging means comprises a charging circuit for charging said battery, and a switching circuit for performing a switching operation between a state of the supply of power to said charging circuit and a state of cut-off of the power to said charging circuit, said switching circuit performing the switching operation in accordance with the charge instruction signal outputted from said signal output means.

* * * * *

UNITED STATES PATENT AND TRADEMARK OFFICE
CERTIFICATE OF CORRECTION

PATENT NO. : 5,448,153

DATED : September 5, 1995

INVENTOR(S) : TETSUHITO IKEDA ET AL.

It is certified that error appears in the above-identified patent and that said Letters Patent is hereby corrected as shown below:

On the title page:

ABSTRACT

Line 9, "being" should read --is being--.

COLUMN 7

Line 6, "form" should read --forms--.

COLUMN 9

Line 60, "rising" should read --raising--.

Signed and Sealed this

Twelfth Day of March, 1996

*Attest:*

BRUCE LEHMAN

*Attesting Officer*     *Commissioner of Patents and Trademarks*